(No Model.) 2 Sheets—Sheet 1.

E. AUSTIN.
OIL AND WATER SEPARATOR.

No. 555,553. Patented Mar. 3, 1896.

WITNESSES
J. E. Thomas
D. Gahagan.

INVENTOR
Eugene Austin.
By Charles H. Fisk
Attorney (No Model.) 2 Sheets—Sheet 2.
E. AUSTIN.
OIL AND WATER SEPARATOR.
No. 555,553. Patented Mar. 3, 1896.
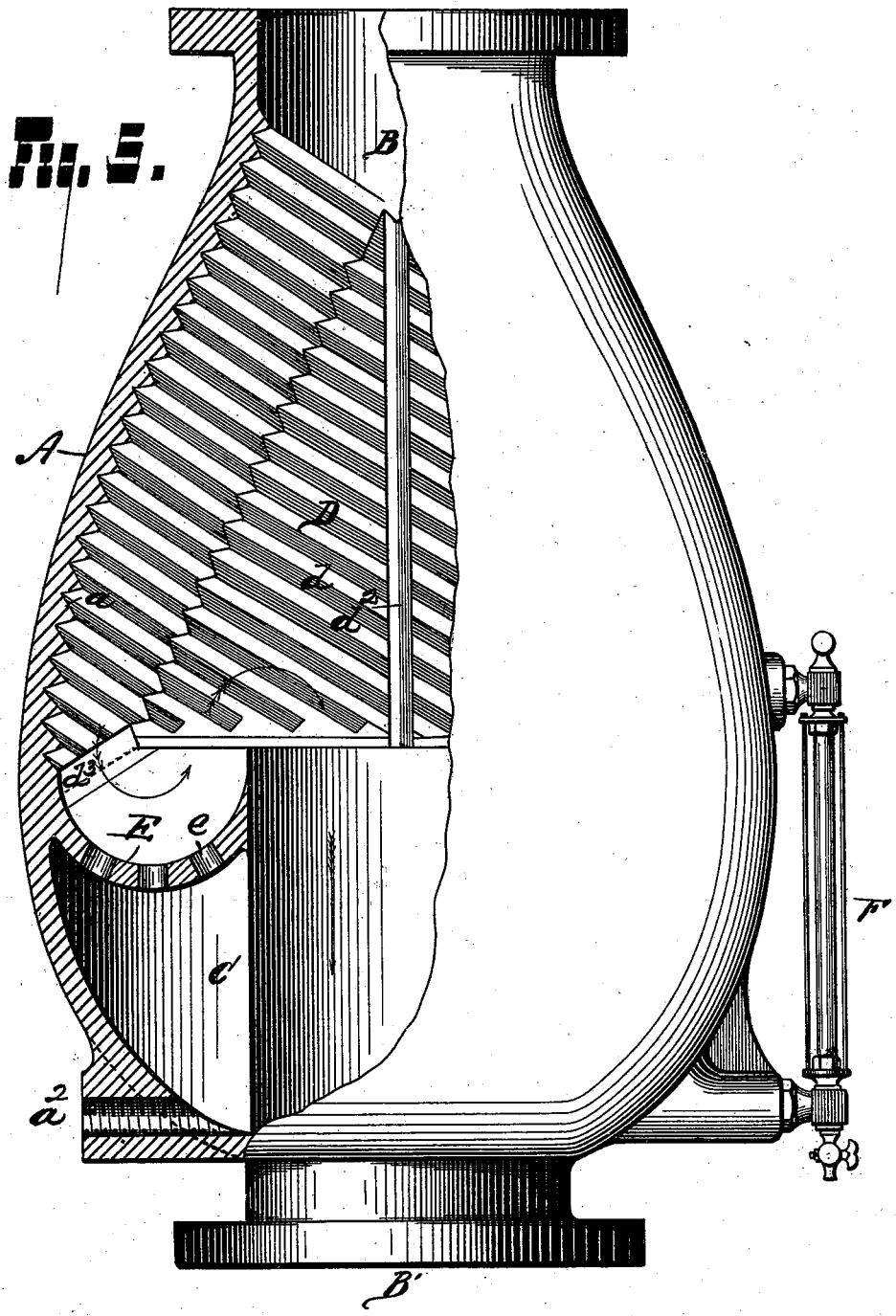
WITNESSES
INVENTOR

UNITED STATES PATENT OFFICE.

EUGENE AUSTIN, OF DETROIT, MICHIGAN, ASSIGNOR TO THE AUSTIN SEPARATOR COMPANY, OF SAME PLACE.

OIL AND WATER SEPARATOR.

SPECIFICATION forming part of Letters Patent No. 555,553, dated March 3, 1896.

Application filed June 17, 1895. Serial No. 553,104. (No model.)

*To all whom it may concern:*

Be it known that I, EUGENE AUSTIN, a citizen of the United States, residing at Detroit, county of Wayne, State of Michigan, have invented a certain new and useful Improvement in Oil and Water Separators; and I declare the following to be a full, clear, and exact description of the invention, such as will enable others skilled in the art to which it pertains to make and use the same, reference being had to the accompanying drawings, which form a part of this specification.

My invention relates to oil and water separators for steam-pipes, and its object is to provide a construction adapted to be used in vertical pipes. The construction herein shown is preferably used where the steam is descending the pipe.

My invention is shown in the accompanying drawings, in which—

Figure 1:
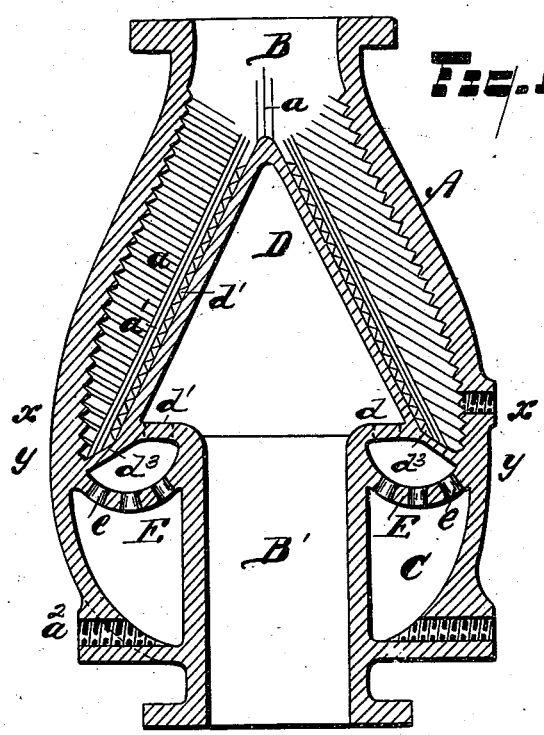
Figure 4:
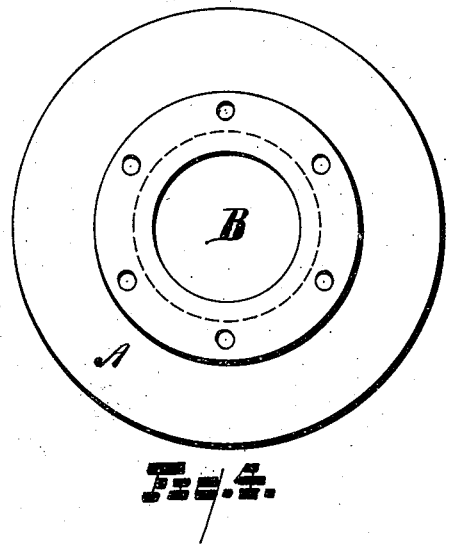
Figure 2:
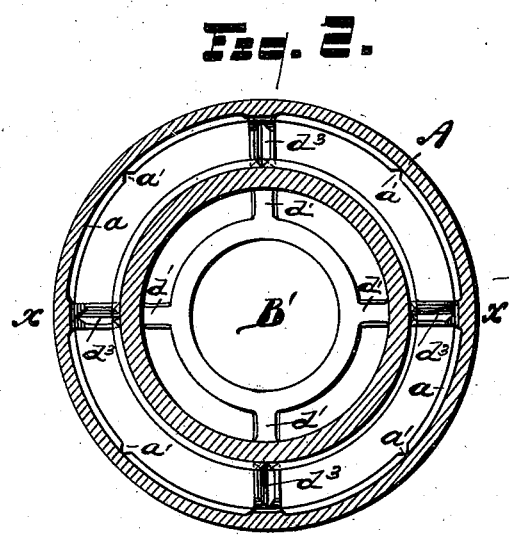
Figure 3:
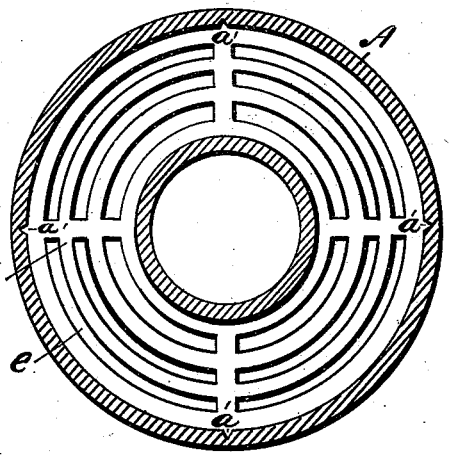

Figure 1 is a vertical section on line $x$ $x$ of Fig. 2. Fig. 2 is a horizontal section on line $x$ $x$ of Fig. 1. Fig. 3 is a sectional view, looking down upon the separating-plate from $y$ $y$, Fig. 1. Fig. 4 is a plan view. Fig. 5 is a view partly in elevation and partly in vertical section.

In the drawings, A is the outer wall of the separator, round in horizontal cross-section, and formed as shown in vertical section in Fig. 1.

B is the steam-inlet, and B' the steam-outlet. The walls of the steam-outlet B' extend upward into the separator, leaving the annular water-chamber C in the lower end of the separator.

D is a cone-shaped deflector, which is larger at the base than the steam-outlet and hangs over the outlet at the base. It is supported on the outlet at intervals on the arms $d'$, leaving a passage between the edge of the base and the outlet-pipe for the steam to pass upward into the interior of the deflector, from which it is deflected downward again and out.

Below the base of the cone-shaped separator is an annular concave plate E, extending around the outlet-pipe and forming a covering to the annular water-chamber C. This annular plate is provided with a series of openings $e$ $e$.

The inner surface of the wall A is provided with diagonal corrugations $a$ $a$ and with a series of vertical grooves $a'$, into which the oil and water flow from the corrugations $a$ $a$.

The cone-shaped deflector D is also provided with diagonal corrugations $d$. These corrugations also lead to vertical channels $d^2$ $d^2$. These lead the water or oil to the lower edge of the deflector, from which it is conducted downward to the annular plate D through troughs $d^3$ $d^3$. These troughs consist of arms cast integral with the case A, and the deflector D, with a channel in their upper surface.

$a^2$ is the discharge-outlet for the chamber C.

F is the sight-tube having a connection at the bottom with the water-chamber and at the top with the steam-chamber, by which the water-level is indicated.

The operation of my device is as follows: The saturated steam entering at B passes downward between the deflector D and the outer wall of the separator, and in passing deposits a portion of the oil and water of saturation on the opposite walls. The steam is then deflected upward by the perforated plate E. As the steam is thus deflected, the oil and water remaining in the steam are projected onto the plate and through the openings $e$ into the water-chamber. The dried steam is then again deflected downward and out through B'.

By the use of the troughs $d^3$ $d^3$, I am able to conduct the water and oil accumulated by the deflector D away from the lower edge of the deflector and beyond the moving steam, by which they would otherwise be swept onward to the outlet.

I am aware that a roof-shaped deflector inclosed in a case provided with a water-outlet and supported on the steam-outlet pipe has been provided with steam-outlet passages to said steam-outlet pipe situated above the water-outlet. In such construction the space between the deflector and case was divided by vertical flanges or ribs in such manner that two diving-flues for wet steam and two ascending flues for steam were provided, the steam-passages to the interior of the deflector being horizontally disposed and situated at the ends only of the deflector. By my improvement steam descends with equal freedom on all sides of the deflector, and has free passage upward to its interior on all sides thereof through vertical passages, and, further, I provide troughs $d^3$ extending from the deflector-wall to the case-wall in a downwardly and outwardly direction, whereby water condensed on the walls is received and condensed away from the steam-outlets and from the ascending currents of steam.

What I claim is—

1. The combination of the exterior casing A having interior corrugations or grooves and having inlet B and steam-outlet conduit B', the connections $d'$ joining the foot of the deflector and the top of said steam-outlet conduit, and water-conveying troughs $d^3$ extending outwardly and downwardly from the foot of the deflector to the wall of the exterior casing and joining said deflector and casing, the base of the deflector overhanging the outlet-conduit and communicating therewith by means of the vertical passages between said parts $d'$ situated above the base of the deflector, substantially as set forth.

2. The combination of the exterior casing A having inlet B and steam-outlet conduit B', the connections $d'$ joining the foot of the deflector and the top of said steam-outlet conduit, and other connections extending outwardly and downwardly from the foot of the deflector to the wall of the exterior casing and joining said deflector and casing, the base of the deflector overhanging the outlet-conduit and communicating therewith by means of the vertical passages between said parts $d'$ situated above the base of the deflector, substantially as set forth.

3. The combination of the wall or exterior casing A having inlet B and steam-outlet conduit B', and the deflector D joined to the casing by water-conveying troughs $d^3$, the base of said deflector overhanging the outlet-conduit and communicating therewith by means of passages situated above the base of the deflector, and the perforated steam-deflecting plate E situated below said troughs and passages, substantially as set forth.

4. The combination of the wall or exterior casing A having inlet B and steam-outlet conduit B', and the deflector D joined to the casing by water-conveying troughs $d^3$, the base of said deflector overhanging the outlet-conduit and communicating therewith by means of passages situated above the base of the deflector, the interior of the casing and the exterior of the deflector being provided with diagonal corrugations and transverse grooves, substantially as set forth.

In testimony whereof I sign this specification in the presence of two witnesses.

EUGENE AUSTIN.

Witnesses:
   CHARLES H. FISK,
   GRACE M. DAVIS.